United States Patent [19]
Takemura et al.

[11] Patent Number: 6,152,605
[45] Date of Patent: Nov. 28, 2000

[54] BALL BEARING

[75] Inventors: Hiromichi Takemura; Kazuo Sekino; Nobuaki Mitamura; Yasuo Murakami; Hiroshi Suzuki; Yoshitaka Hayashi, all of Kanagawa, Japan

[73] Assignee: NSK Ltd., Tokyo, Japan

[21] Appl. No.: 09/379,748

[22] Filed: Aug. 24, 1999

[30] Foreign Application Priority Data

Aug. 25, 1998 [JP] Japan .................................. 10-239142

[51] Int. Cl.$^7$ ............................. F16C 33/58; F16C 33/66
[52] U.S. Cl. ............................................ 384/516; 384/462
[58] Field of Search .................................... 384/513, 516, 384/609, 462, 464

[56] References Cited

U.S. PATENT DOCUMENTS

| | | | |
|---|---|---|---|
| H885 | 2/1991 | Nagashima | 384/457 |
| 3,370,899 | 2/1968 | Eklund | 384/516 |
| 4,334,721 | 6/1982 | Satoh et al. | 384/516 X |
| 4,343,521 | 8/1982 | Akabane et al. | 384/516 X |
| 4,565,457 | 1/1986 | Flander | 384/516 X |

*Primary Examiner*—Thomas R. Hannon
*Attorney, Agent, or Firm*—Suhgrue, Mion, Zinn, Macpeak & Seas, PLLC

[57] ABSTRACT

A ball bearing in which races are well prevented from flaking in early stages under an environment using lubricating oil having a high traction coefficient so that a long life of the ball bearing is attained, while the cost of the bearing is reduced. The ball bearing has a plurality of balls disposed between a fixed race and a rotating race, and the ball bearing is used under an environment using lubricating oil having a traction coefficient of 0.07 or more under the conditions that a slip factor is 5% and a temperature is 40° C. At least the groove radius of the rotating race is set to be in a range of from 0.53 Dw to 0.58 Dw both inclusive when Dw designates the diameter of balls. In addition, the hardness of the race is set to be in a range of from HRC 58 to HRC 64 both inclusive.

9 Claims, 2 Drawing Sheets

A TYPE

B TYPE

BALL BEARING

BACKGROUND OF THE INVENTION

1. Field of the Invention

The present invention relates to a ball bearing, and particularly relates to a ball bearing used, for example, in a transmission portion of a car under the condition that lubricating oil with a high traction coefficient, such as automatic transmission fluid (hereinafter abbreviated to 'ATF'), is used as a medium.

2. Description of the Related Art

As shown in the method of calculation for a dynamic rated load and a rated life of a rolling bearing in JISB1518, as for deep groove ball bearings and angular ball bearings, it is prescribed that the groove radius of an inner should not exceed 0.52 Dw and the groove radius of an outer race should not exceed 0.53 Dw where Dw designates the diameter of a ball, in the calculation of a basic dynamic radial rated load of the bearing.

This is because when the groove radius of a race is set to be larger than the above-mentioned value, the dynamic rated load is reduced so that the calculated rolling life is lowered. It is therefore a conventional solution to set the groove radius of a race to be as small as possible in order to reduce the contact surface pressure of the race surface to attain a long life of the bearing.

Lubricating oil superior in fluidity, such as spindle oil, turbine oil or the like, is used for lubrication of such a rolling bearing. On the other hand, gear oil, machine oil or the like is also used so that the lubricating oil for the rolling bearing is made common with lubricating oil for other parts around the bearing such as gears and so on.

Rolling bearings may be used under various environments. For example, in a radial ball bearing attached to a portion for guiding a gear or the like and supporting a rolling load, a slip is apt to be produced when lubricating oil such as ATF or the like having a high friction coefficient unsuitably for the rolling characteristic of the bearing is used as lubricating oil. It has been confirmed that flaking is produced in a race in a short time in accordance with the increase of the friction coefficient or the increase of the temperature.

ATF is lubricating oil used in an automatic transmission including a torque converter, a gear mechanism, a hydraulic mechanism, a wet clutch, etc. ATF is required to have many functions such as lubrication of a heating medium or a friction material, preservation of appropriate frictional characteristic, and so on, in order to actuate the mechanisms of the automatic transmission smoothly.

In a rolling bearing used under an environment using such ATF having a high traction coefficient, for example, in a radial ball bearing, a differential slip of an inner race which is a rotating race becomes large. As a result, the position where a Pv value (the product of contact surface pressure and velocity) becomes the maximum is located not at the center of the race (see FIG. 3) but at two places which are apart from the center in a contact ellipse (see FIG. 4), so that the tangential force increases. It was confirmed that flaking is produced in a shorter time than the calculated rolling life prescribed in JISB1518.

There is known a technique for changing the groove radius of a race of a rolling bearing so as to improve the bearing life as disclosed, for example, in Japanese Utility Model Uneximined Publication No. Hei. 5-86026. According to the technique disclosed therein, not only at least one of outer and inner races is formed from powdered high speed steel having a hardness of HRC 65 or more, but also a value obtained by dividing a ratio $\rho$ (R/r) of a groove radius R of the race to a rolling element radius r thereof by a ratio $\rho_0(R_0/r_0)$ of a groove radius $R_0$ of a race formed from bearing steel to a rolling element radius $r_0$ thereof is set to be in a range of from 1.0 to 1.12. As a result, torque or very small slips can be reduced so that the temperature of the bearing can be restrained from increasing. As a result, the life of the bearing can be improved.

There is also known a full type ball bearing in which the groove radius of an inner race (rotating race) is made larger than the groove radius of an outer race as disclosed in Japanese Patent Unexamined Publication No. Hei.7-23898. In the full type ball bearing, slips of balls can be reduced at the time of high temperature and high velocity while the influence of heat can be reduced, so that the rolling life can be prolonged.

However, in the technique disclosed in the Japanese Utility Model Uneximined Publication No. Hei. 5-86026, the cost of the bearing becomes high because at least one of the outer and inner races is formed from powdered high-speed steel having a hardness of HRC 65 or more. In addition, it is assumed that the bearing is used not under an environment in which ATF having a high traction coefficient is used but under an environment in which spindle oil having a high fluidity is used in a machine tool. Therefore, even if the groove radii of the races are simply changed, the temperature rising of the bearing is merely suppressed under the environment using ATF. Accordingly, this technique cannot be expected as measures against flaking.

On the other hand, in the technique disclosed in the Japanese Patent Unexamined Publication No. Hei.7-23898, the groove radius of the inner race (rotating race) is set to be 61±2% of ball diameter Dw, while the groove radius of the outer race (fixed race) is set to be 56±2% of the ball diameter Dw. Therefore, the contact surface pressure becomes small because the number of rolling elements is large in a full type ball bearing. However, in the case of a general deep groove ball bearing, for example, the value of the contact surface pressure Pmax reaches 450 kgf/mm² or more when P (dynamic equivalent load)/C (JIS dynamic rated load)=0.5 and the groove radius of the rotating race is 59% of the ball diameter Dw. Thus, plastic deformation appears in the rolling race surface, so that it is difficult for the bearing to fulfill the function as a bearing.

SUMMARY OF THE INVENTION

It is an object of the present invention to solve the foregoing problems.

It is another object of the present invention to provide a ball bearing in which races can be well prevented from flaking in early stages under an environment using lubricating oil having a high traction coefficient so that it is possible to realize a long life of the bearing and to reduce the cost.

In order to attain the foregoing objects, according to the present invention, there is provided a ball bearing comprising:

a fixed race;

a rotating race;

a plurality of balls disposed between the fixed race and the rotating race; and a lubricating oil disposed in a space between the fixed race and the rotating race, the lubricating oil having a traction coefficient of 0.07 or more under conditions that a slip factor is 5% and a temperature is 40° C., wherein a groove radius of the rotating race is set to be in a range of from 0.53 Dw to 0.58 Dw both inclusive where Dw designates a ball diameter, and at least one of the fixed race and the rotating race has hardness in a range of from HRC 58 to HRC 64 both inclusive.

In this case, it is preferable that the groove radius of the rotating race is made larger than the groove radius of the fixed race.

DETAILED DESCRIPTION OF THE PREFERRED EMBODIMENT

Figure 1:
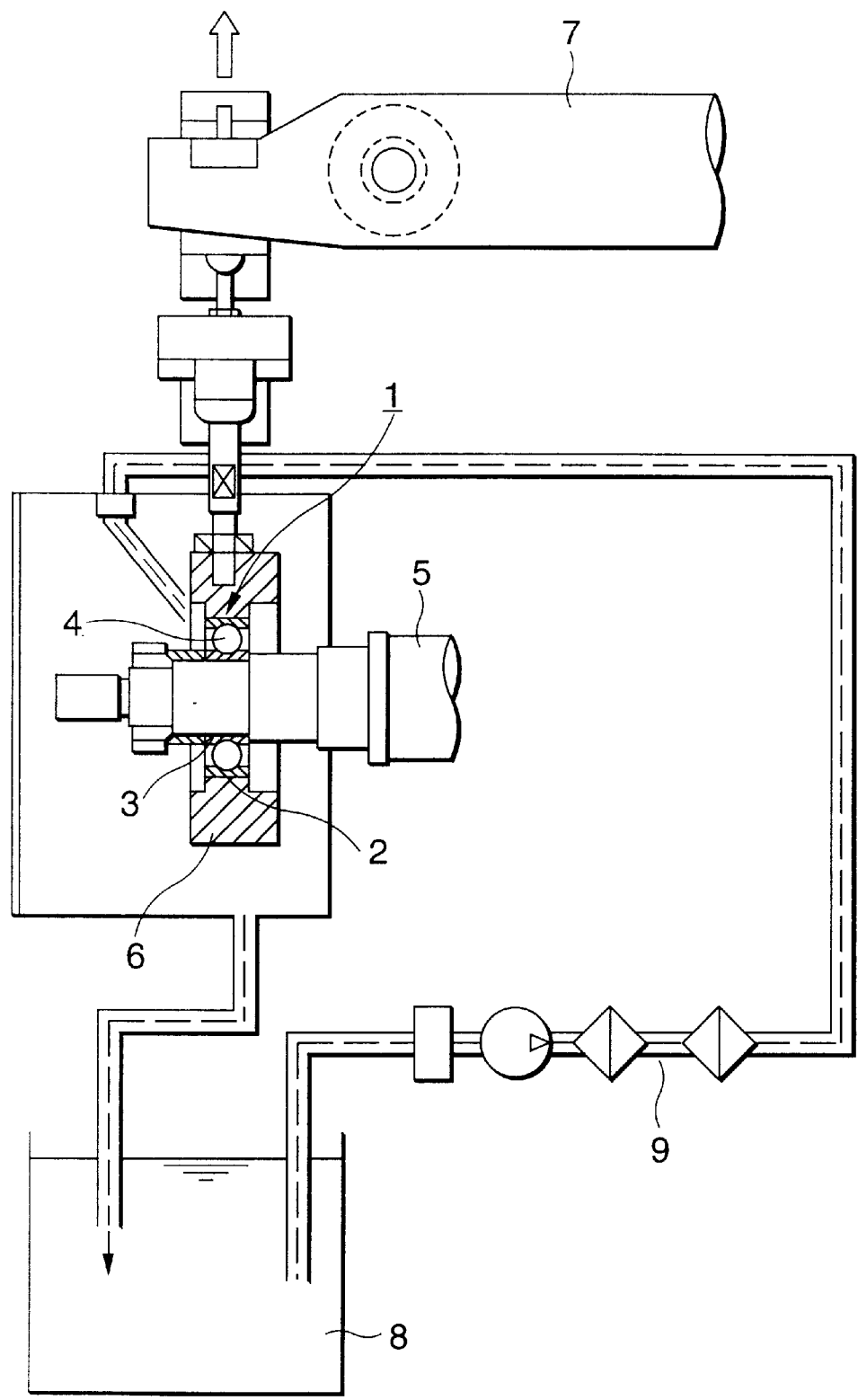
FIG. 1 is a schematic view of a cantilever type life tester.
Figure 2:
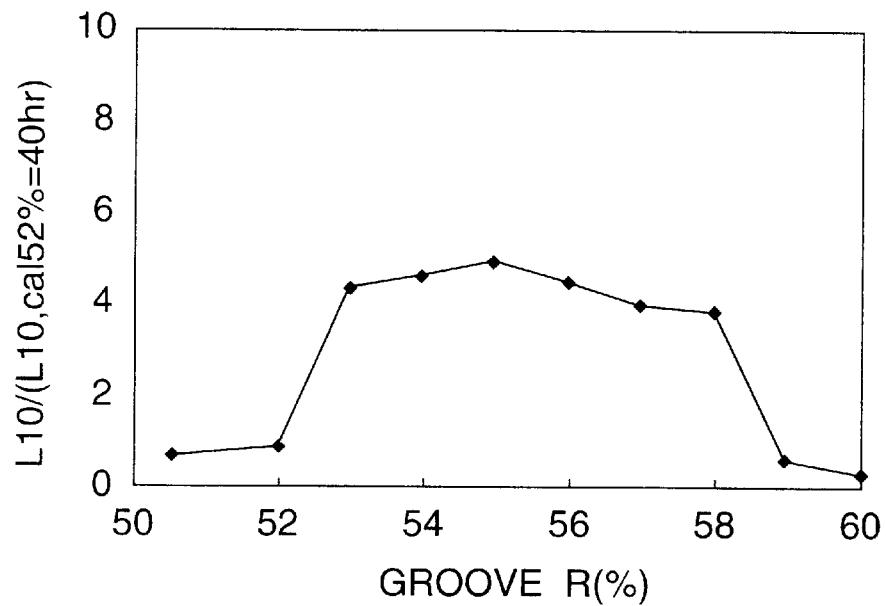
FIG. 2 is a graph showing a relationship between the groove radius of a race and the life of a bearing.
Figure 3:
FIG. 3 is a view showing a state in which flaking has occurred at the center of a race.
Figure 4:
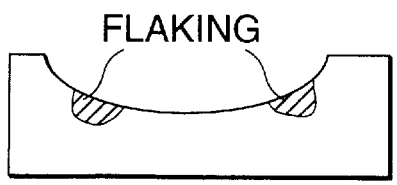
FIG. 4 is a view showing a state in which flaking has occurred at two places which are slightly apart from the center in a contact ellipse of the race.

An embodiment of the present invention will be described below with reference to the drawings. FIG. 1 is a schematic view of a cantilever type life tester; FIG. 2 is a graph showing a relationship between the groove radius of a race and the life of a bearing; FIG. 3 is a view showing a state in which flaking has occurred at the center of the race; and FIG. 4 is a view showing a state in which flaking has occurred at two places which are apart from the center of the race in a contact ellipse of the race.

Table 1 shows a list of dimensions of radial ball bearings used as inventive examples and comparative examples. The radial ball bearings used for life tests were 6206 deep groove ball bearings each having an outer diameter of 62 mm, an inner diameter of 30 mm and a width of 16 mm. Each of the bearings in the inventive and comparative examples was assembled while changing the groove radius of the race. A gap of the bearing was made standard size. Then, in each inventive example, inner and outer races were arranged so that the groove radii (groove R) of the races were set to be in a range of from 53% to 58% of ball diameter Dw. On the other hand, in each comparative example, inner and outer races were arranged so that the groove radii (groove R) of the races were set to be in a range of from 50.5% to 60% of ball diameter Dw.

TABLE 1

|  |  | inner race groove R (%) | outer race groove R (%) | race hardness (HRC) |
|---|---|---|---|---|
| inventive examples | 1 | 53 | 53 | 62 |
|  | 2 | 54 | 54 | 62 |
|  | 3 | 55 | 55 | 62 |
|  | 4 | 56 | 56 | 62 |
|  | 5 | 57 | 57 | 62 |
|  | 6 | 58 | 58 | 62 |
|  | 7 | 53 | 52 | 58 |
|  | 8 | 53 | 52 | 60 |
|  | 9 | 53 | 52 | 64 |
|  | 10 | 55 | 52 | 62 |
| comparative examples | 1 | 50.5 | 50.5 | 62 |
|  | 2 | 52 | 52 | 62 |
|  | 3 | 59 | 59 | 62 |
|  | 4 | 60 | 60 | 62 |
|  | 5 | 53 | 53 | 56 |
|  | 6 | 55 | 52 | 56 |

The material of the bearings used for the life tests was SUJ2 in both the inventive examples and the comparative examples. In both the inventive examples and the comparative examples, the same working and heat treating were given to inner and outer races. In addition, the residual amount of austenite was set to be in a range of from 0 to 20%; the surface roughness of races was set to be in a range of from 0.01 to 0.04 $\mu$mRa; the surface hardness of balls (rolling elements) was set to be HRC 63; and the surface roughness of the balls was set to be in a range of from 0.003 to 0.010 $\mu$mRa. Further, the surface hardness of each race in the inventive examples was set to be in a range of from HRC 58 to HRC 64, while the surface hardness of each race in the comparative examples was set to be in a range of from HRC 56 to HRC 62.

Next, description will be made about the bearing life testing method.

The respective radial ball bearings of the inventive examples 1 to 10 and the comparative examples 1 to 6 were set in the cantilever type life tester shown in FIG. 1. Life tests were performed upon the respective radial ball bearings under the conditions that a testing temperature was 100° C., a testing load was Fr=980 Kgf (equivalent to P/C=0.5 in the JIS Standards), a testing speed was n=3300 rpm in an inner ring, and a number of times of tests was n=10.

Further, two kinds of lubricating oils, naphthene mineral oil (slip factor 5%, and traction coefficient $\mu$=0.06 under the condition of 40° C.) and commercial synthetic traction oil (slip factor 5%, and traction coefficient $\mu$=0.09 under the condition of 40° C.) shown in Table 2, were prepared. In these tests, the commercial synthetic traction oil was first used. In FIG. 1, the reference numeral 1 represents a radial ball bearing; 2, an outer race (fixed side); 3, an inner race (rotating side); 4, a ball; 5, a shaft; 6, a housing; 7, a load lever; 8, an oil bath tub; and 9, a filter.

Further, the bearing life test was suspended when vibration took a value 5 times as large as an initial value, and flaking was observed. Since the calculated life of each rolling bearing is Lcal 52% (calculated life on the assumption that the groove radius of a race is 52% of the ball diameter)=40 hours according to JIS B1518, the time to terminate the test was set to be 200 hours which was 5 times as long as the calculated life.

TABLE 2

|  | dynamic viscosity (cSt) | | traction characteristic ($\mu$) | |
|---|---|---|---|---|
|  | 40° C. | 100° C. | 40° C. | 100° C. |
| naphthene mineral oil | 28.9 | 4.67 | 0.06 | 0.04 |
| commercial synthetic traction oil | 30.8 | 5.31 | 0.09 | 0.07 |

Here, as for the general relationship between traction oil and traction characteristic, a maximum traction coefficient $\mu$ (under the condition of 40° C.) at a circumferential velocity of 4.1 m/s and a slip factor of 5% obtained by using a double cylinder tester is used as the characteristic of each traction oil in Table 2, as shown in "Lubrication", Vol. 33, No. 11 (1988), p.811–p.815, edited by Japanese Society of Tribologists, published by Yokendo Co., Ltd.

Table 3 and FIG. 2 show the results of the bearing life tests when the commercial synthetic traction oil shown in Table 2 was used as lubricating oil. FIG. 2 shows the relationship between the groove radius and the life ratio (L10 life/calculated life Lcal 52%) about the inventive examples 1 to 6 and the comparative examples 1 to 4 in which the inner and outer races had the same groove radius.

TABLE 3

|  |  | evaluation time L10 (hr) | L10/ Lcal 52% | existence of flaking | flaking form |
|---|---|---|---|---|---|
| inventive examples | 1 | 176 | 4.4 | 5/10 outer race flaking | A |
|  | 2 | 187 | 4.68 | 3/10 outer race flaking | A |
|  | 3 | 198 | 4.95 | 2/10 outer race flaking | A |
|  | 4 | 181 | 4.53 | 2/10 inner race flaking | A |
|  | 5 | 159 | 3.98 | 4/10 inner race flaking | A |
|  | 6 | 154 | 3.85 | 5/10 inner race flaking | A |
|  | 7 | 140 | 3.5 | 3/10 inner race flaking | A |
|  | 8 | 198 | 4.95 | 1/10 inner race flaking | A |
|  | 9 | 200 | 5 | no flaking | — |
|  | 10 | 200 | 5 | no flaking | — |
| comparative examples | 1 | 30 | 0.75 | 10/10 inner race flaking | B |
|  | 2 | 33 | 0.83 | 10/10 inner race flaking | B |
|  | 3 | 20 | 0.5 | 10/10 inner race flaking | A |
|  | 4 | 11 | 0.28 | 10/10 inner race flaking | A |
|  | 5 | 67 | 1.68 | 10/10 inner race flaking | A |
|  | 6 | 54 | 1.35 | 10/10 inner race flaking | A |

As is apparent from Table 3, it is understood that the L10 lives in the inventive examples 1 to 3 were 176 hours, 187 hours and 198 hours respectively, which were 4 times or more as long as the calculated life. Flaking was produced concentratedly in the outer races. The number of flakings were 5/10, 3/10 and 2/10respectively. The flaking was produced in the position shown in FIG. 3 as type A (at the center of the race). This effect of elongating the flaking life was based on the fact that the groove radius of the inner race was set to be in a range of from 53 to 55% of the ball diameter. As a result, the differential slip was reduced in comparison with that in the standards of JIS B1518 (52% of the ball diameter) while the contact surface pressure in the outer race increased so that flaking was produced concentratedly in the outer race.

On the other hand, it is understood that, as for the inventive examples 4 to 6, the L10 lives were 181 hours, 159 hours and 154 hours respectively, which were longer than the calculated life. Flaking was produced concentratedly in the inner races. The numbers of flakings were 2/10, 4/10 and 5/10 respectively. Flaking was produced in the position shown, as type A, in FIG. 3. Flaking occurred at a maximum contact surface pressure position. This was because the groove radii of the inner races increased to 56%, 57% and 58% so that the contact surface pressure became high.

In the inventive examples 7 to 9, the groove radii of the inner races were set to be 53% of the ball diameter while the surface hardness of the races was changed to be in a range of from HRC 58 to 64. As the surface hardness increased, the L10 lives became 140 hours, 199 hours and 200 hours respectively, which were much longer than the calculated life.

In the inventive example 10, the groove radius of the inner race (rotating race) was set to be 55% of the ball diameter while the groove radius of the outer race (fixed race) was set to be 52% of the ball diameter. As a result, the maximum contact surface pressure produced in the outer race was reduced, so that no flaking was produced even when the time in the L10 life reached 200 hours.

On the contrary, in the comparative examples 1 and 2, the groove radii of the inner races were 50.5% and 52% of the ball diameter respectively. The differential slip value in the inner race was therefore higher than that in the outer race. Flaking was produced concentratedly in the inner race. The L10 lives were 30 hours and 33 hours respectively, which were shorter than the calculated life. In addition, the number of flakings was 10/10 in each example. Flaking was produced in the positions shown, as type B, in FIG. 4.

In the comparative examples 3 and 4, the groove radii of the inner races were 59% and 60% of the ball diameter respectively, which were so large that the differential slip acting on the inner race was reduced while the contact surface pressure increased. Accordingly, flaking was produced in the inner race frequently to be 10/10. Thus, the L10 lives were 20 hours and 11 hours, which were 1/2 or less of the calculated life.

As for the comparative examples 5 and 6, the lives were longer than those in the other comparative examples. However, the surface hardness of the races was low to be HRC 56, so that the L10 lives were 67 hours and 54 hours which were shorter than those in the inventive examples.

Although each of the above-mentioned inventive examples, deep groove ball bearings were illustrated as ball bearings by way of example. However, those bearings may be replaced by angular ball bearings, self-aligning ball bearings, or thrust ball bearings. In those cases, it is also possible to obtain a similar effect.

Although two kinds of bearing steels subjected to ordinary heat treatment were used in the above-mentioned inventive examples, dimensional stabilization treatment may be given to the bearing steels in order to further improve the performance of the bearings. In addition, even if the bearing steel is replaced by case hardening steel, it is possible to obtain a similar effect.

Next, Table 4 shows the results of the bearing life tests when the naphthene mineral oil shown in Table 2 was used as lubricating oil. The bearings of the inventive examples 1, 5 and 10 and the bearings of the comparative examples 1, 3 and 5 were used for the life tests. The testing method and conditions were made the same as those in the case where the commercial synthetic traction oil was used.

TABLE 4

|  |  | evaluation time L10 (hr) | L10/ Lcal 52% | existence of flaking | flaking form |
|---|---|---|---|---|---|
| inventive examples | 1 | 200 | 5 | no flaking | — |
|  | 5 | 200 | 5 | no flaking | — |
|  | 10 | 200 | 5 | no flaking | — |
| comparative examples | 1 | 200 | 5 | no flaking | — |
|  | 3 | 64 | 1.6 | 10/10 inner race flaking | A |
|  | 5 | 118 | 2.95 | 10/10 inner race flaking | A |

As is apparent from Table 4, no flaking occurred in any race in the incentive examples 1, 5 and 10 even when the time of the L10 lives reached 200 hours.

On the contrary, in the comparative example 3, the contact surface pressure in the inner race became so high that flaking occurred in the inner race. In addition, the L10 life was 64 hours, which was about 3 times as long as the L10 life in the case where the commercial synthetic traction oil was used.

In the comparative example 5, the surface hardness of the race was HRC 56, which was so low that the neighborhood of the race surface was apt to be plastically deformed. The L10 life was 118 hours which became about twice as long as the L10 life in the case where the commercial synthetic traction oil was used. This was because the tangential force was reduced by use of the naphthene mineral oil having a low traction coefficient so that reduction in equivalent stress in rolling fatigue influenced on the L10 life.

In the comparative example 1, no flaking occurred even when the time of the L10 life reached 200 hours. This was because no flaking occurs in early stages if the traction coefficient takes a low value of not more than 0.06.

Under the condition that the temperature of use reaches 150° C. or more, it is preferable that a bearing subjected to dimensional stabilization treatment is used.

As is apparent from the above description, according to the present invention, the groove radii of races are established so that a slip acting on a ball bearing can be reduced while the maximum contact surface pressure can be reduced under the condition that lubricating oil having a high traction coefficient is used as a medium. It is therefore possible to well prevent flaking in early stages. As a result, there can be obtained an effect that it is possible to realize a long life of the ball bearing under an environment in which lubricating oil having a high traction coefficient is used.

In addition, it is not necessary to form the races from expensive powdered high speed steel having a hardness of HRC 65 or more. It is therefore possible to obtain an effect that the cost of the ball bearing can be reduced.

The present invention is based on Japanese Patent Application No. Hei. 10-239142, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball bearing comprising:

a fixed race;

a rotating race;

a plurality of balls disposed between said fixed race and said rotating race; and a lubricating oil disposed in a space between said fixed race and said rotating race, said lubricating oil having a traction coefficient of 0.07 or more under conditions that a slip factor is 5% and a temperature is 40° C., wherein a groove radius of said rotating race is set to be in a range of from 0.53 Dw to 0.58 Dw both inclusive where Dw designates a ball diameter, and at least one of said fixed race and said rotating race has hardness in a range of from HRC 58 to HRC 64 both inclusive.

2. The ball bearing according to claim 1, wherein said groove radius of said rotating race is made larger than a groove radius of said fixed race.

3. The ball bearing according to claim 1, wherein said rotating race is an inner race, and said fixed race is an outer race.

4. The ball bearing according to claim 1, wherein a groove radius of said fixed race is set to be in a range of from 0.52 Dw to 0.58 Dw both inclusive where Dw designates a ball diameter.

5. The ball bearing according to claim 4, wherein said groove radius of said rotating race is made larger than said groove radius of said fixed race.

6. The ball bearing according to claim 4, wherein said rotating race is an inner race, and said fixed race is an outer race.

7. The ball bearing according to claim 1, wherein a groove radius of said fixed race is set to be in a range of from 0.53 Dw to 0.58 Dw both inclusive where Dw designates a ball diameter.

8. The ball bearing according to claim 7, wherein said groove radius of said rotating race is made larger than said groove radius of said fixed race.

9. The ball bearing according to claim 7, wherein said rotating race is an inner race, and said fixed race is an outer race.

* * * * *